UNITED STATES PATENT OFFICE.

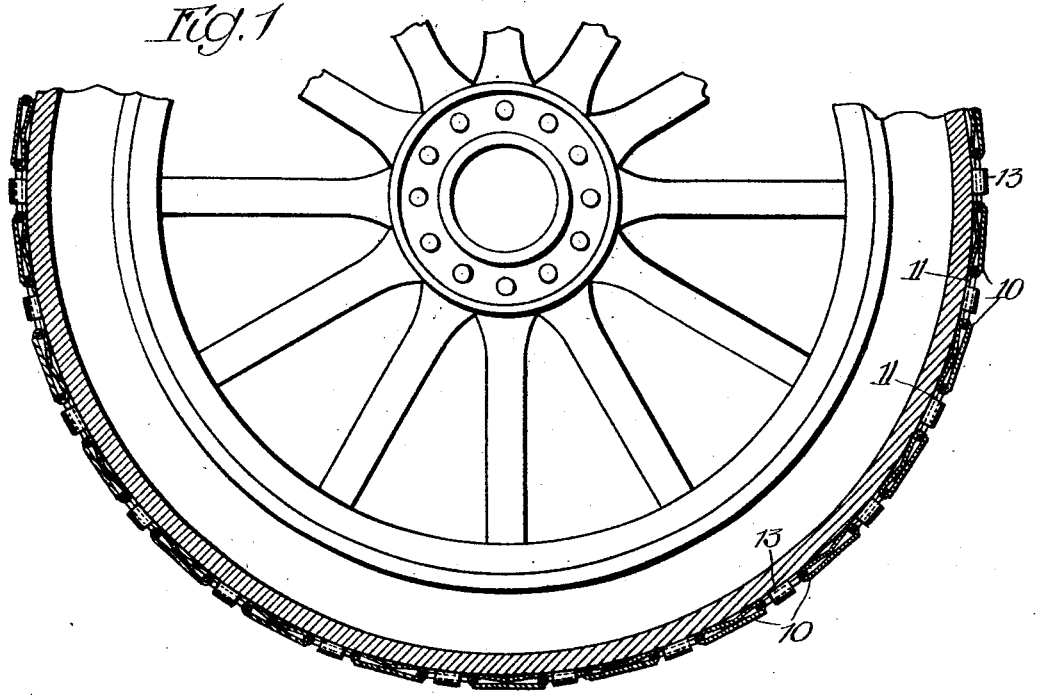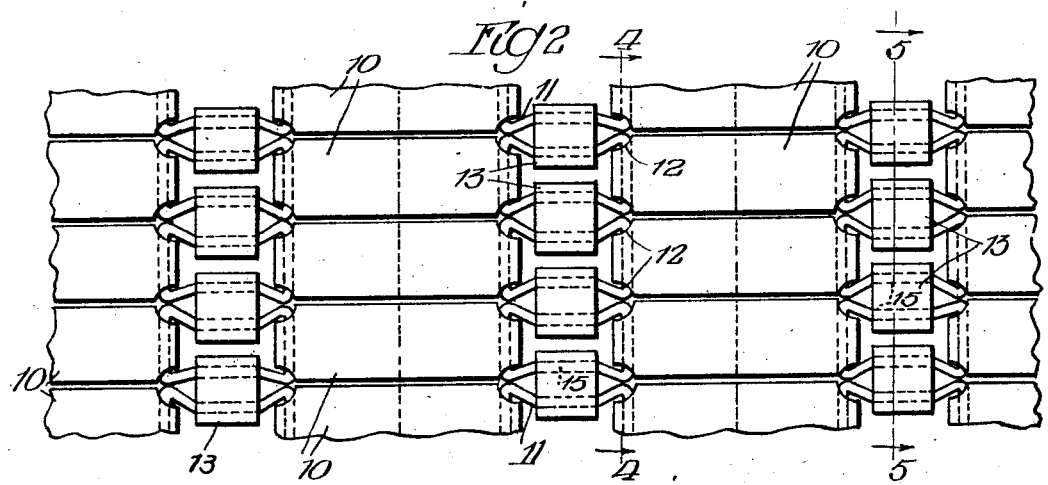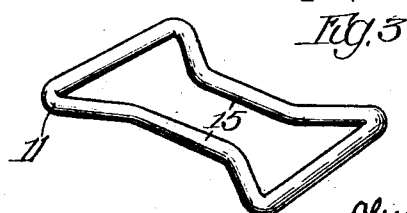

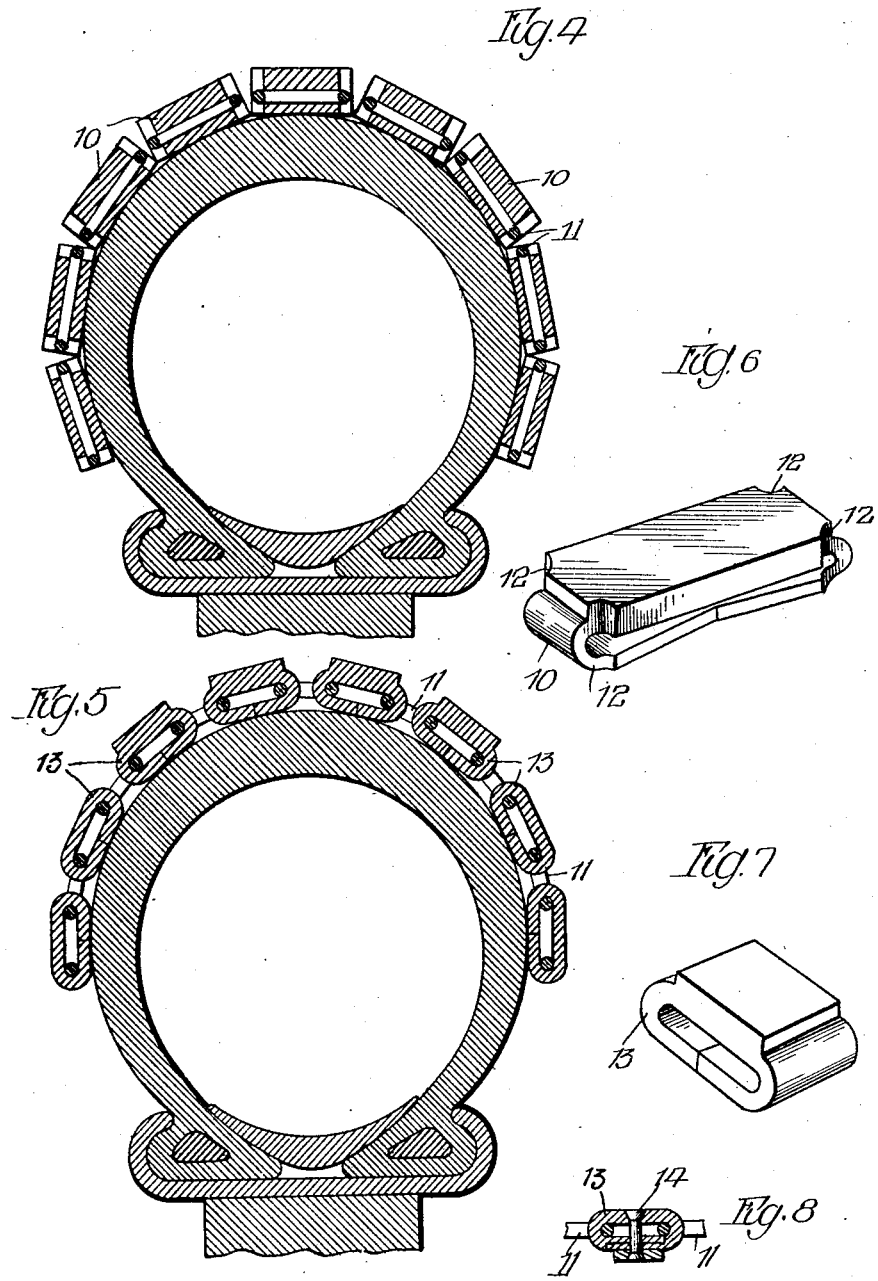

CHRISTIAN C. KLOPFENSTEIN, OF BISBEE, ARIZONA.

TIRE GUARD.

1,409,899.  Specification of Letters Patent.  Patented Mar. 14, 1922.

Application filed June 5, 1919. Serial No. 301,913.

*To all whom it may concern:*

Be it known that I, CHRISTIAN C. KLOPFENSTEIN, a citizen of the United States, residing at Bisbee, in the county of Cochise and State of Arizona, have invented new and useful Improvements in Tire Guards, of which the following is a full, clear, concise, and exact description, reference being had to the accompanying drawing, forming a part of this specification.

My invention relates to improvements in guards for pneumatic tires, and has for its object the production of a device of this character which may be readily and easily applied to a tire; one which will be of a flexible nature permitting of the same conforming at all times with the contour of the tire, one which will afford exceptional protection to the tire against wear and usage, and also a guard in which the parts thereof will be so connected as to permit of ready repair or substitution of parts when necessary.

Other objects will appear hereinafter.

In the drawings—

Fig. 1 is a central section through a pneumatic vehicle wheel equipped with a guard or an armor embodying the invention;

Fig. 2 is a fragmental plan view of the guard removed;

Fig. 3 is a perspective view of one of the links employed in the device;

Figs. 4 and 5 are sections through the guard and tire, said sections being taken along lines corresponding with lines 4—4 and 5—5 respectively of Fig. 2;

Fig. 6 is a perspective view of one of the guard plates detached;

Fig. 7 is a perspective view of one of the connecting bands detached, and

Fig. 8 is a section through a slightly modified form of connecting band.

The preferred form of construction, as illustrated in the drawings, comprises an armor or guard made up of a plurality of elongated plates 10, said plates being arranged in spaced parallel rows which extend transversely of the tire. The adjacent ends of the plates of adjacent rows thereof are connected together by links 11 substantially rectangular in form. The ends of said plates are bent around the ends of said links and are cut away as at 12, so as to accommodate said links and permit of adjacent plates lying in close proximity with each other, as clearly seen in Fig. 2.

The links 11 of each series thereof are connected together by bands 13, the ends of which are bent around the sides of said links, as clearly seen in Fig. 5. If desired, the inwardly turned ends of the bands 13 may be of such length that the same overlap, as seen in Fig. 8, and a rivet 14 may be employed, if desired, to positively secure each band in position.

With a construction as set forth, it will be seen that a guard is provided formed of a plurality of inter-connected plates and links or connecting elements, said parts, in the formation of the guard, being so proportioned in size that a guard will be formed which is adapted to embrace and snugly fit a conventional pneumatic tire, as clearly seen in the several views.

In order to lend yieldability or resiliency to the device, the sides of links 11 are inwardly offset or depressed as at 15, it being clear that with this arrangement each link is rendered longitudinally, as well as laterally, adjustable, inasmuch as straightening of the offset sides of the link results in increasing the length of the link and in the outward movement of the sides thereof. This is of special advantage in that it allows for variations in the size of tires for which the same is intended, it being clear with this construction, where the tire is slightly oversize, the guard will yield sufficiently to accommodate the tire. This yieldable or resilient character of the guard is also of special advantage in that, with this arrangement, where the guard is subjected to sudden extreme pressure, such as results when an automobile is brought to a sudden stop, the guard will yield slightly rather than break or fracture, such as might otherwise result with a non-yielding structure.

The exposed portions of the plates 10 and bands 13 which register with the tread of the tire and which, therefore, contact with the pavement in the use of the guard, are of increased thickness in order to adapt the same to better and longer withstand the wear to which the same are subjected. This increased thickness of the plates 10 and bands 13, as described, is best shown in Figs. 4 and 5.

Having thus described my invention, what I claim is new and desire to secure by Letters Patent is:

1. An armor for pneumatic tires comprising a plurality of plates adapted to be arranged about a tire, and yieldable links connecting said plates.

2. An armor for pneumatic tires comprising a plurality of plates adapted to be arranged about a tire, and links connecting said plates having offset opposite sides.

3. An armor for pneumatic tires comprising a plurality of plates adapted to be arranged about a tire, links connecting said plates having offset opposite sides, and means connecting said links, said means engaging said offset sides of said links.

In witness whereof, I have hereunto subscribed my name.

CHRISTIAN C. KLOPFENSTEIN.